(12) United States Patent
Smith et al.

(10) Patent No.: US 6,669,873 B1
(45) Date of Patent: Dec. 30, 2003

(54) OPTICAL RESIN COMPOSITION COMPRISING THIOL-ENE PREPOLYMER

(75) Inventors: Robert A. Smith, Murrysville, PA (US); Robert D. Herold, Monroeville, PA (US); Michael O. Okoroafor, Export, PA (US)

(73) Assignee: PPC Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/524,619

(22) Filed: Mar. 14, 2000

Related U.S. Application Data

(60) Provisional application No. 60/130,596, filed on Apr. 22, 1999.

(51) Int. Cl.$^7$ ............................ G02B 5/23; G08G 75/04
(52) U.S. Cl. .................. 252/586; 252/183.11; 528/373; 528/376
(58) Field of Search ............................ 252/183.11, 586; 528/373, 376

(56) References Cited

U.S. PATENT DOCUMENTS

| | | | |
|---|---|---|---|
| 2,370,567 A | 2/1945 | Muskat et al. | 260/463 |
| 2,403,113 A | 7/1946 | Muskat et al. | 260/78 |
| 3,361,706 A | 1/1968 | Meriwether et al. | 260/39 |
| 3,562,172 A | 2/1971 | Ono et al. | 252/300 |
| 3,567,605 A | 3/1971 | Becker | 204/158 |
| 3,578,602 A | 5/1971 | Ono et al. | 252/300 |
| 3,661,744 A | 5/1972 | Kehr et al. | 204/159.14 |
| 4,166,043 A | 8/1979 | Uhlmann et al. | 252/300 |
| 4,215,010 A | 7/1980 | Hovey et al. | 252/300 |
| 4,342,668 A | 8/1982 | Hovey et al. | 252/586 |
| 4,367,170 A | 1/1983 | Uhlmann et al. | 252/586 |
| 4,637,698 A | 1/1987 | Kwak et al. | 351/163 |
| 4,742,133 A | 5/1988 | Tang et al. | 526/235 |
| 4,816,584 A | 3/1989 | Kwak et al. | 344/71 |
| 4,818,096 A | 4/1989 | Heller et al. | 351/163 |
| 4,826,977 A | 5/1989 | Heller et al. | 544/70 |
| 4,880,667 A | 11/1989 | Welch | 427/160 |
| 4,931,219 A | 6/1990 | Kwiatkowski et al. | 252/586 |
| 4,931,220 A | 6/1990 | Haynes et al. | 252/586 |
| 5,047,576 A | 9/1991 | Takenosita et al. | 560/125 |
| 5,066,818 A | 11/1991 | Gemert et al. | 549/389 |
| 5,238,931 A | 8/1993 | Yoshikawa et al. | 514/184 |
| 5,274,132 A | 12/1993 | Van Gemert | 549/389 |
| 5,288,844 A | 2/1994 | Sakagami | 528/376 |
| 5,358,976 A | 10/1994 | Dowling et al. | 522/18 |
| 5,384,077 A | 1/1995 | Knowles | 252/586 |
| 5,405,958 A | 4/1995 | VanGemert | 544/71 |
| 5,429,774 A | 7/1995 | Kumar | 252/586 |
| 5,459,175 A | 10/1995 | Woods et al. | 522/180 |
| 5,466,398 A | 11/1995 | Van Gemert et al. | 252/586 |
| 5,484,872 A | 1/1996 | Kanesaki et al. | 528/73 |
| 5,558,937 A | 9/1996 | Woods et al. | 428/378 |
| 5,593,795 A | 1/1997 | Chen et al. | 429/192 |
| 5,739,243 A | 4/1998 | Herold et al. | 526/325 |
| 5,917,006 A | 6/1999 | Smith et al. | 528/373 |
| 5,976,422 A * | 11/1999 | Okoroafor et al. | 252/586 |

FOREIGN PATENT DOCUMENTS

| | | |
|---|---|---|
| EP | 0 598 551 A2 | 5/1994 |
| JP | 62-195383 | 8/1987 |
| JP | 63-309509 | 12/1988 |
| WO | 96/38486 | 5/1996 |
| WO | 97/44372 | 11/1997 |

OTHER PUBLICATIONS

Robert C. Bertelson, Chapter III " Photochromic Processes Involving Heterolytic Cleavage", *Techniques of Chemistry*, vol. III, Photochromism, pp 45–55, 252–254, 399, 842, Wiley–Interscience, 1971.

Operator's Manual, The Bausch & Lomb ABBE–3L Refractometer, pp 8, 12, 1983.

Standard Test Method for Index of Refraction of Transparent Organic Plastics, ASTM Designation: D 542–95, pp 1–3.

* cited by examiner

*Primary Examiner*—Kriellion A. Sanders
(74) *Attorney, Agent, or Firm*—Carol A. Marmo; James R. Franks

(57) ABSTRACT

Described is a polymerizable organic composition comprising: (a) a radically polymerizable gel-free prepolymer of (i) at least one first polymerizable monomer having at least two radically polymerizable ethylenically unsaturated groups, e.g., divinyl benzene, and (ii) at least one first polythiol monomer having at least two thiol groups, e.g., thioglycerol bis(mercaptoacetate); and (b) at least one second polymerizable monomer having at least two radically polymerizable ethylenically unsaturated groups, e.g., divinyl benzene and/or methacrylic anhydride, the first and second radically polymerizable monomers each being substantially free of norbornene groups. The molar equivalent ratio of ethylenically unsaturated groups of (a)(i) to the thiol groups of (a)(ii) is no greater than 1:1. The described polymerizable composition has reduced shrinkage, and a polymerizate prepared therefrom has a refractive index of at least 1.57 and an Abbe number of at least 33.

20 Claims, No Drawings

OPTICAL RESIN COMPOSITION COMPRISING THIOL-ENE PREPOLYMER

CROSS REFERENCE TO RELATED APPLICATION

This a nonprovisional patent application claiming priority under 35 U.S.C. 119(e)(1) of U.S. Provisional Patent Application Serial No. 60/130,596 filed Apr. 22, 1999.

DESCRIPTION OF THE INVENTION

The present invention relates to polymerizable organic compositions having reduced shrinkage and solid polymerizates prepared therefrom having a refractive index of at least 1.57, and an Abbe number of at least 33. Particularly, the present invention relates to certain polymerizable organic compositions comprising a substantially gel-free liquid prepolymer of a first polyethylenically unsaturated monomer and a polythiol monomer, and a separate second polyethylenically unsaturated monomer. More particularly, the polymerizable compositions of the present invention have a percent shrinkage less than that of a corresponding polymerizable composition containing no prepolymer.

Organic polymeric materials having refractive indices of at least 1.57 and low levels of chromatic dispersion have been developed recently as alternatives and replacements for high refractive index inorganic silica based glass for applications such as optical lenses. These polymeric materials can provide advantages relative to glass, including, shatter resistance, lighter weight for a given application, ease of molding and ease of dying. The chromatic dispersion of an optical lens is typically quantified with reference to Abbe numbers (also known as nu-values). Lower Abbe numbers are indicative of an increasing level of chromatic dispersion, which is typically manifested as an optical distortion at or near the rim of the lens. Values of Abbe numbers corresponding to desirably lower levels of chromatic dispersion are, for example, typically at least 33 and more typically at least 35.

It is known that polymeric materials having high refractive indices, e.g., of at least 1.57, and low levels of chromatic dispersion, e.g., having Abbe numbers of at least 33, can be prepared from polymerizable compositions containing monomers having at least two thiol groups and monomers having two or more radically polymerizable ethylenically unsaturated groups. Such compositions, which are referred to in the art as thiol-ene compositions, are described in, for example, U.S. Pat. No. 5,484,972, and International Patent Publication No. WO 96/38486.

Molded articles, such as lenses, are typically prepared by introducing a polymerizable composition into a mold, e.g., a glass mold, polymerizing the composition within the mold, and then removing the molded article from the mold. Many polymerizable organic compositions, e.g., polymerizable thiol-ene compositions, undergo a decrease or shrinkage in volume upon polymerization. This decrease in volume can cause the polymerizing composition to pull away from the interior surfaces of the mold resulting in the formation of defects in the molded article. Defects due to volume shrinkage include, for example, cracking, warping and surface anomalies, and typically require scrapping of the defective article, resulting in increased production costs.

Accordingly, it is desirable to develop polymerizable organic thiol-ene compositions having a reduced level of shrinkage upon polymerization, and from which can be prepared polymerizates, such as optical lenses and in particular ophthalmic lenses, having a combination of high refractive index, e.g., at least 1.57, and high Abbe values, e.g., at least 33, and preferably at least 35. It is further desirable that polymerizates prepared from such newly developed thiol-ene compositions also have physical properties, e.g., thermal properties, that are at least substantially the same as those of polymerizates prepared from corresponding thiol-ene compositions having a higher level of shrinkage.

U.S. Pat. No. 5,917,006 describes a polymerizable organic composition comprising an aromatic monomer having at least two vinyl groups, e.g., divinyl benzene, a polythiol monomer having at least two thiol groups, e.g., pentaerythritol tetrakis(2-mercaptoacetate), and an anhydride monomer having at least one ethylenically unsaturated group, e.g., methacrylic anhydride. The '006 patent does not describe compositions comprising radically polymerizable prepolymers of ethylenically unsaturated monomers and polythiols.

U.S. Pat. No. 5,976,422 describes a polymerizable organic composition comprising at least one polymerizable monomer having at least two ethylenically unsaturated groups, e.g., divinyl benzene, a novel polythiol monomer, e.g., thioglycerol bis(2-mercaptoacetate), and optionally a monoethylenically unsaturated monomer, e.g., phenoxyethyl methacrylate, and/or an anhydride monomer, e.g., methacrylic anhydride. The compositions of the '422 patent are not described as comprising radically polymerizable prepolymers of ethylenically unsaturated monomers and polythiols.

U.S. Pat. No. 5,593,795 describes a solvent-free polymerizable prepolymeric syrup comprising a multi-ene functional alkylene oxide, a multi-functional thiol, and an electrolyte salt. The '795 patent does not describe combining the prepolymeric syrup with additional radically polymerizable monomers prior to polymerizing the syrup to form an electrolyte composition in the form of a film.

U.S. Pat. No. 5,459,175 describes curable thiol-ene compositions comprising a polythiol and a compound having a plurality of norbornene groups, wherein one of either the polythiol or the compound having a plurality of norbornene groups has a poly(tetramethylene oxide) backbone, or is an oligomer thereof. The '175 patent further describes preparing the oligomer(s) by heating a mixture of the polythiol and the compound having a plurality of norbornene groups, and then formulating the curable thiol-ene composition by adding the appropriate quantity of the depleted monomer.

Japanese Kokai Patent Application No. 63-309509 describes high refractive resin compositions comprising (a) a vinyl group-terminated liquid thioether polymerizable monomer mixture and (b) a polymerizable monomer having terminal (meth)acryloyl groups. The vinyl group-terminated liquid thioether monomer (a) of JP 63-309509 is obtained by an addition reaction of divinylbenzene and a polythiol in the presence of a radical initiator, wherein the equivalent ratio of vinyl groups (of the divinylbenzene) to thiol groups (of the polythiol) is from 3:1 to 10:1.

In accordance with the present invention, there is provided a polymerizable organic composition comprising:
  (a) a radically polymerizable prepolymer of,
    (i) at least one first polymerizable monomer having at least two radically polymerizable ethylenically unsaturated groups, and
    (ii) at least one first polythiol monomer having at least two thiol groups, the molar equivalent ratio of ethylenically unsaturated groups of (a)(i) to thiol groups of (a)(ii) is no greater than 1:1, and the percent consumption of ethylenically unsaturated groups of (a)(i) is selected such that said prepolymer is a substantially gel-free liquid at 25° C.; and (b) at least one second polymerizable monomer having at least two radically polymerizable ethylenically unsaturated groups, wherein a polymerizate of said polymerizable organic composition has a refractive index of at least 1.57, as determined in accordance with American Standard Test Method (ASTM) number D 542-95, an Abbe number, i.e., a nu-value, of at least 33, as determined using an appropriate instrument, e.g., a Bausch & Lomb ABBE-3L Refractometer, said polymerizable organic composition having a percent shrinkage less than that of a corresponding prepolymer-free polymerizable composition containing monomers (a)(i), (a)(ii) and (b), said first and second radically polymerizable monomers each being substantially free of norbornene groups.

Other than in the operating examples, or where otherwise indicated, all numbers or expressions referring to quantities of ingredients, reaction conditions, etc. used in the specification and claims are to be understood as modified in all instances by the term "about."

DETAILED DESCRIPTION OF THE INVENTION

Polymerizable organic compositions according to the present invention have a percent shrinkage less than that of a corresponding prepolymer-free polymerizable composition containing the same monomers, e.g., monomers (a)(i), (a)(ii) and (b) as described previously herein, in the same relative amounts, and polymerized under substantially similar conditions, e.g., thermal polymerization. An example of a polymerizable composition according to the present invention comprises: a prepolymer of 11.8 grams divinyl benzene (DVB) and 39.0 grams thioglycerol bis(mercaptoacetate) (TGBMA); 20.7 grams DVB; 8.5 grams pentaerythritol tetra(mercaptoacetate) (PETMA); and 20.0 grams methacrylic anhydride (MAAn). For purposes of illustration, a polymerizable composition corresponding to this specific example comprises in toto: 32.5 grams DVB, 39.0 grams TGBMA; 8.5 grams PETMA; and 20.0 grams MAAn.

As used herein and in the claims, "percent shrinkage" is determined from a comparison of density data using the following equation:

$$100 \times \{(\text{density of the polymerizate}) - (\text{density of the polymerizable composition})\} \div (\text{density of the polymerizate}).$$

The relative amounts of radically polymerizable prepolymer and additional monomers, e.g., the second polymerizable ethylenically unsaturated monomer, of the composition of the present invention are selected such that a measurable reduction in percent shrinkage is obtained relative to a corresponding composition.

The radically polymerizable prepolymer of the present invention is prepared from at least one polythiol monomer. As used herein, by "thiol," "thiol group," "mercapto" or "mercapto group" is meant an —SH group which is capable of forming a covalent bond with an ethylenically unsaturated group, e.g., a vinyl group. Not intending to be bound by any theory, it is believed that covalent bonds are formed between the thiol groups and ethylenically unsaturated groups of the monomers used to prepare the prepolymer by means of a thiol-ene reaction mechanism, as it is known to those of ordinary skill in the art. As used herein and in the claims, "radically polymerizable prepolymer" and related terms refer to the prepolymer and any oligomeric species and/or unreacted monomers present therewith.

The molar equivalent ratio of ethylenically unsaturated groups to thiol groups of the monomers used to prepare the prepolymer is less than or equal to 1:1. As gelation of the prepolymer is more likely to occur when the molar equivalent ratio of ethylenically unsaturated groups to thiol groups of the monomers used to prepare the prepolymer is equal to 1:1, molar equivalent ratios of less than 1:1 are preferred.

Substantially gel-free liquid prepolymers prepared from molar equivalent ratios of ethylenically unsaturated groups to thiol groups of less than 1:1 are generally more stable upon storage, i.e., less prone to gelation. While not intending to be bound by any theory, it is believed that gelation due to carbon-carbon covalent bond formation between ethylenically unsaturated groups is minimized during storage when the prepolymer is prepared from molar equivalent ratios of ethylenically unsaturated groups to thiol groups that are less than 1:1.

The functionality of the prepolymer of the present invention is also related to the selection of the molar equivalent ratio of ethylenically unsaturated groups to thiol groups of the monomers used in its preparation. The prepolymer can have thiol groups or a combination of thiol and ethylenically unsaturated groups.

In a preferred embodiment of the present invention, the molar equivalent ratio of ethylenically unsaturated groups to thiol groups is selected from ratios less than 1:1, and the resulting prepolymer is substantially thiol functional. The molar equivalent ratio of ethylenically unsaturated groups to thiol groups of the monomers used to prepare the prepolymer of the present invention is typically from 0.2:1 to 0.85:1, preferably from 0.3:1 to 0.75:1 and more preferably from 0.4:1 to 0.65:1.

The percent consumption of ethylenically unsaturated groups of the monomers used to prepare the prepolymer of the present invention is selected such that the prepolymer is a substantially gel-free liquid at 25° C. The percent consumption of ethylenically unsaturated groups is based on a comparison of the number of ethylenically unsaturated groups present prior to and at completion of the reaction of the monomers used to prepared the prepolymer, e.g., monomers (a)(i) and (a)(ii). The percent consumption of ethylenically unsaturated groups is determined by means of suitable analytical methods, including, infrared and nuclear magnetic resonance (NMR) analysis.

As the exact nature of the thiol-ene reaction mechanism is not fully understood, for a given molar equivalent ratio of ethylenically unsaturated groups to thiol groups of the monomers used to prepare the prepolymer of the present invention, the selection of the percent consumption of ethylenically unsaturated groups is readily determined by experimentation. Typically, one or more molar equivalent ratios are initially evaluated to determine at what level of percent consumption of ethylenically unsaturated groups gelation is observed to occur. In subsequent evaluations of these same molar equivalent ratios, the polymerizations can be stopped at a level of percent consumption of ethylenically unsaturated groups that is less than that which was previously found to result in gelation of the prepolymer. The reaction between the ethylenically unsaturated monomer and the polythiol is typically stopped or stalled by quickly reducing the temperature of the reaction mixture, e.g., through the use of an ice bath and subsequent refrigeration, and/or by adding inhibitors, e.g., free radical polymerization inhibitors, to the reaction mixture.

The percent consumption of ethylenically unsaturated groups is generally driven to as high a level as is possible without gelling the prepolymer. The percent consumption of ethylenically unsaturated groups is typically at least 20 percent, preferably at least 30 percent and more preferably at least 40 percent, based on the initial level of ethylenic unsaturation of the composition from which the prepolymer is prepared. The percent consumption of ethylenically unsaturated groups is also typically less than 100 percent, more typically less than 95 percent, preferably less than 80 percent, and more preferably less than 70 percent, based on the initial level of ethylenic unsaturation of the composition from which the prepolymer is prepared. The percent consumption of ethylenically unsaturated groups of the composition from which the prepolymer of the present invention is prepared may be selected from any combination of these values, inclusive of the recited values.

The prepolymer of the present invention may be prepared by suitable methods known in the art, such as thermal and/or photopolymerization methods in the optional presence of suitable catalysts and/or initiators (including those discussed further herein), and under either an oxygen containing or inert atmosphere. In a preferred embodiment of the present invention, the prepolymer is prepared by mixing the ethylenically unsaturated and polythiol monomers in the substantial absence of externally added catalysts and initiators, and with optional heating to a temperature of typically less than 100° C., e.g., less than 60° C. or 40° C. After the desired level of percent consumption of ethylenically unsaturated groups has been reached, the prepolymer is either: (a) immediately combined with additional monomers, e.g., at least one second radically polymerizable monomer, to form the polymerizable composition of the present invention; or (b) stored, preferably at reduced temperatures, e.g., 5° C. or lower, until later used to prepare polymerizable compositions according to the present invention.

The gel-free prepolymer of the present invention may have a wide range of molecular weights. Typically, the prepolymer has a weight average molecular weight ($M_w$) of at least 800, preferably at least 1000 and more preferably at least 2000. The prepolymer typically also has an $M_w$ of less than 15,000, preferably less than 10,000 and more preferably less than 8000. The molecular weight of the prepolymer of the present invention may range between any combination of these values, inclusive of the recited values. As used herein, unless otherwise noted, values of $M_w$ are determined from gel permeation chromatography using polyethylene glycol standards. The spindle viscosity at 25° C. of the prepolymer of the present invention is typically from 800 to 100,000 centipoise (cPs), e.g., from 10,000 to 40,000 cPs.

Optionally, polymerization inhibitors may be added to the prepolymer of the present invention, in particular when the prepolymer is stored for later use. Suitable polymerization inhibitors include those known in the art, for example, phenolic antioxidants and non-acidic nitroso compounds (e.g., the aluminum salt of N-nitrosophenylhydroxylamine, available from Wako Chemicals GmbH as Q1301) as described in U.S. Pat. No. 5,358,976. If present, the polymerization inhibitor(s) is typically present in at least an inhibiting amount, e.g., in an amount from 0.001 percent by weight to 8 percent by weight, based on the total weight of prepolymer.

The prepolymer is typically present in the polymerizable organic composition of the present invention in an amount of at least 10 percent by weight, preferably at least 20 percent by weight, and more preferably at least 30 percent by weight, based on the total weight of the composition. The prepolymer is also typically present in the polymerizable composition of the present invention in an amount of less than 90 percent by weight, preferably less than 80 percent by weight, and more preferably less than 70 percent by weight, based on the total weight of the composition. The amount of prepolymer present in the polymerizable composition may range between any combination of these values, inclusive of the recited values.

Polymerizable compositions according to the present invention include in addition to the radically polymerizable prepolymer, at least one second polymerizable monomer having at least two ethylenically unsaturated groups. The second ethylenically unsaturated monomer may be the same or different than the ethylenically unsaturated monomer used to prepare the prepolymer, e.g., the first ethylenically unsaturated monomer.

The ethylenically unsaturated monomer used to prepare the prepolymer, e.g., the first ethylenically unsaturated monomer, and the second ethylenically unsaturated monomer may each be selected independently from at least one monomer having ethylenically unsaturated groups selected from the group consisting of vinyl, allyl, substituted allyl, (meth)acryloyl and combinations thereof. Combinations of monomers having different ethylenically unsaturated groups may be used, e.g., combinations of vinyl functional, (meth) acryloyl functional and allyl functional monomers. As used herein and in the claims, "(meth)acryloyl" and like terms are meant to refer to acryloyl groups, methacryloyl groups and combinations of acryloyl and methacryloyl groups.

In an embodiment of the present invention, the ethylenically unsaturated monomer used to prepare the prepolymer, e.g., the first ethylenically unsaturated monomer, and the second ethylenically unsaturated monomer may each be independently selected from aromatic monomers having at least two vinyl groups. Examples of such aromatic monomers that may be used in the present invention include, but are not limited to: divinyl benzene, e.g., 1,2-divinyl benzene, 1,3-divinyl benzene, 1,4-divinyl benzene and mixtures of structural isomers of divinyl benzene; diisopropenyl benzene, e.g., 1,2-diisopropenyl benzene, 1,3-diisopropenyl benzene, 1,4-diisopropenyl benzene and mixtures of structural isomers of diisopropenyl benzene; trivinyl benzene, e.g., 1,2,4-triethenyl benzene, 1,3,5-triethenyl benzene and mixtures of structural isomers of trivinyl benzene; divinyl naphthalene, e.g., 2,6-diethenyl naphthalene, 1,7-diethenyl naphthalene, 1,4-diethenyl naphthalene and mixtures of structural isomers of divinyl naphthalene; halogen substituted derivatives of divinyl benzene, diisopropenyl benzene, trivinyl benzene and divinyl naphthalene, e.g., 2-chloro-1, 4-diethenyl benzene; and mixtures of such aromatic monomers. In a particularly preferred embodiment of the present invention, the aromatic monomer having at least two vinyl groups is divinyl benzene.

Examples of monomers having (meth)acryloyl groups, from which each of the ethylenically unsaturated monomer used to prepare the prepolymer of the present invention, e.g., the first ethylenically unsaturated monomer, and the second ethylenically unsaturated monomer may independently be selected include:

(i) (meth)acrylic anhydride, i.e., acrylic anhydride and/or methacrylic anhydride;

(ii) a monomer represented by the following general formula I,

I

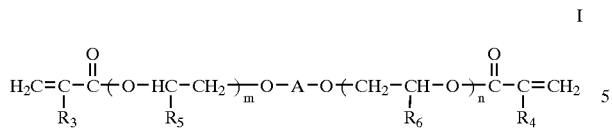

wherein m and n are each a positive number, the sum of m and n being from 0 to 70, preferably 2 to 30, and more preferably 4 to 10, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene (usually containing from 1 to 8 carbon atoms), cyclic alkylene (usually being 5 to 8 carbon atoms), phenylene, $C_1$–$C_9$ alkyl substituted phenylene, and a group represented by the following general formula II,

II

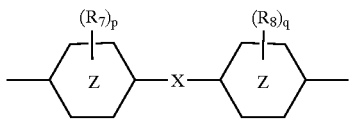

wherein, $R_7$ and $R_8$ are each $C_1$–$C_4$ alkyl, chlorine or bromine,
p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$)(C$_6$H$_5$)— or

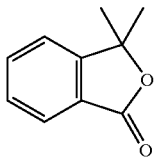

when

is the divalent benzene group, and X is O, S, —CH$_2$—, or —C(CH$_3$)$_2$— when

is the divalent cyclohexane group;
(iii) a bis[(meth)acryloyl-terminated]poly(ethylene glycol) monomer, that is different than monomer (ii), having a number average molecular weight from 200 to 2000 grams/mole;
(iv) a poly(meth)acryloyl terminated monomer represented by the following general formula III,

III

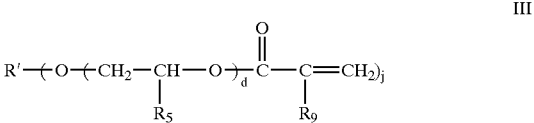

wherein R' is a polyvalent radical of a polyol, $R_9$ is hydrogen or methyl, $R_5$ is hydrogen or $C_1$ to $C_2$ alkyl, preferably hydrogen, d is a number from 0 to 20, and j is a whole number from 3 to 6, preferably 3 to 4 and more preferably 3; and
(v) mixtures of monomers selected from monomers (i), (ii), (iii) and (iv).

The polymerizable monomer (ii) represented by general formula I may be prepared by methods that are well known in the art. When the sum of m and n is greater than 0, one such commonly used method involves the alkoxylation of a diol, e.g., 4,4'-isopropylidenediphenol, followed by esterification of the alkoxylated diol with a $C_1$ to $C_6$ alkyl (meth)acrylate. Preparation of the polymerizable monomer (ii) represented by general formula I is described in further detail in U.S. Pat. No. 5,279,243 at column 4, lines 24–63, which disclosure is incorporated herein by reference.

In a preferred embodiment of the present invention, with reference to general formulas I and II, X is —C(CH$_3$)$_2$—,

represents a divalent benzene group, p and q are each 0, $R_3$ and $R_4$ are each methyl, $R_5$ and $R_6$ are each hydrogen, and the sum of m and n is from 4 to 10.

Polymerizable monomer (iii) is different than monomer (ii) and can be prepared as is known in the art from an esterification or transesterification reaction between poly(ethylene glycol) and an alpha-beta unsaturated acid or ester such as methacrylic acid, a $C_1$ to $C_6$ alkyl methacrylate, acrylic acid, a $C_1$ to $C_6$ alkyl acrylate, or a combination thereof. The bis[(meth)acryloyl-terminated]poly(ethylene glycol) monomer, preferably has a number average molecular weight from 200 to 1200, more preferably from 500 to 700, grams/mole, as determined by gel permeation chromatography using a polystyrene standard. A particularly preferred monomer (iii) is a bismethacrylate of polyethylene glycol, having a number average molecular weight of 600 grams/mole.

Polymerizable monomer (iv), as previously described with reference to general formula III, may be prepared by methods that are well known in the art. For example, when d is greater than 0, monomer (iv) is typically prepared by alkoxylating a polyol, e.g., trimethylolpropane, followed by esterification of the alkoxylated polyol with a $C_1$ to $C_6$ alkyl (meth)acrylate. Preparation of the polymerizable monomer (iv) represented by general formula III, is described in further detail in U.S. Pat. No. 5,739,243 at column 5, lines 7–26, which disclosure is incorporated herein by reference.

Examples of polyols suitable for use in preparing polymerizable monomer (iv) include, but are not limited to, glycerol, trimethylolpropane, 1,3,5-tris(2-hydroxyethyl) isocyanurate, di-trimethylolpropane, pentaerythritol and dipentaerythritol. A particularly preferred polymerizable monomer (iv) may be defined with reference to general formula III wherein R' is a radical of pentaerythritol, d is 0, j is 3 or 4 and $R_9$ is hydrogen.

As used herein, and with reference to general formula III, the phrase "R' is a polyvalent radical of a polyol" is meant to refer to the polyvalent residue of the polyol used in preparing polymerizable monomer (iv). For example, in the case of pentaerythritol tetraacrylate (for which d is 0, j is four and $R_9$ is hydrogen), R' is the tetravalent radical of pentaerythritol, i.e., tetramethylenemethane.

The ethylenically unsaturated monomer used to prepare the prepolymer of the present invention, e.g., the first ethylenically unsaturated monomer, and the second ethylenically unsaturated monomer may also be independently selected from allyl carbonate or substituted allyl carbonate functional monomers represented by the following general formula IV,

$$R\text{—[—O—C(O)—O—}R_{10}\text{]}_i \qquad \text{IV}$$

wherein R is a radical derived from a polyol, $R_{10}$ is a radical derived from an allyl or substituted allyl group and i is a whole number from 2 to 6, preferably from 2 to 4, and more preferably 2.

The polymerizable monomer represented by general formula IV, may be further described as a polyol(allyl carbonate) monomer. Polyol(allyl carbonate) monomers that may be used in the aforedescribed polymerizable organic composition are allyl carbonates of linear or branched aliphatic or aromatic polyols, e.g., aliphatic glycol bis(allyl carbonate) compounds and alkylidene bisphenol bis(allyl carbonate) compounds. The polyol(allyl carbonate) monomer may be prepared by procedures well known in the art, e.g., as described in U.S. Pat. Nos. 2,370,567 and 2,403,113.

In reference to general formula IV, $R_{10}$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. The $R_{10}$ radical may be represented by the following general formula V:

$$H_2C\text{=}C(R_{11})\text{—}CH_2\text{—} \qquad V$$

wherein $R_{11}$ is hydrogen, halogen or a $C_1$ to $C_4$ alkyl group. Most commonly, $R_{11}$ is hydrogen and consequently $R_{10}$ is the unsubstituted allyl group, $H_2C$=CH—$CH_2$—.

In reference to general formula IV, R is a polyvalent radical derived from a polyol which can be an aliphatic, cycloaliphatic or an aromatic polyol containing 2, 3, 4, 5 or 6 hydroxy groups. Typically, the polyol contains 2 hydroxy groups, i.e., a glycol or bisphenol. The aliphatic polyol may be linear or branched and contain from 2 to 10 carbon atoms. Commonly, the aliphatic polyol is an alkylene glycol having from 2 to 4 carbons atoms, ethylene glycol, propylene glycol, trimethylene glycol, tetramethylene glycol, or a poly($C_2$–$C_4$) alkylene glycol, e.g., diethylene glycol, triethylene glycol, etc. Other useful polyols include aromatic polyols such as bisphenols, e.g., 4,4'-isopropylidenediphenol, and cycloaliphatic polyols such as biscyclohexanols, e.g., 4,4'-isopropylidenebiscyclohexanol.

Specific examples of polyol(allyl carbonate) monomers that may be used in the polymerizable organic compositions of the present invention, include, but are not limited to, diethylene glycol bis(allyl carbonate), 4,4'-isopropylidenebiscyclohexanol bis(allyl carbonate), 4,4'-isopropylidenediphenol bis(allyl carbonate), oxy bisphenol bis(allyl carbonate) and sulfonyl bisphenol bis(allyl carbonate). A preferred polyol(allyl carbonate) monomer is 4,4'-isopropylidenediphenol bis(allyl carbonate).

A more detailed description of polyol(allyl carbonate) monomers suitable for use in the present invention is found in U.S. Pat. No. 4,637,698 at column 3, line 33 through column 5, line 61, and U.S. Pat. No. 4,742,133 at column 3, line 25 through column 4, line 18. These disclosures are hereby incorporated by reference and summarized above. As used in the present description with reference to general formula IV, the term polyol(allyl carbonate) monomer or like names, e.g., 4,4'-isopropylidenediphenol bis(allyl carbonate), is intended to mean and include the named monomers or prepolymers thereof and any related monomer or oligomer species found with said monomer as a consequence of the process used to synthesize the monomer.

The second ethylenically unsaturated monomer is typically present in the polymerizable composition of the present invention in an amount of at least 8 percent by weight, preferably at least 12 percent by weight, and more preferably at least 16 percent by weight, based on the total weight of the polymerizable composition. The second ethylenically unsaturated monomer is also typically present in an amount of less than 90 percent by weight, preferably less than 60 percent by weight, and more preferably less than 30 percent by weight, based on the total weight of the polymerizable composition of the present invention. The amount of second ethylenically unsaturated monomer may range between any combination of these values, inclusive of the recited values.

Polymerizable organic compositions according to the present invention may optionally include a radically polymerizable monoethylenically unsaturated monomer, i.e., a monomer having only a single ethylenically unsaturated group. Examples of such monomers include, but are not limited to: acrylic acid; methacrylic acid; esters of acrylic acid such as methyl or ethyl acrylate and 2-hydroxyethyl acrylate; esters o: methacrylic acid, such as methyl or ethyl methacrylate, phenoxyethyl methacrylate, isobornyl methacrylate, cyclohexyl methacrylate and 2-hydroxyethyl methacrylate; allyl esters, e.g., allyl benzoate; allyl carbonates, e.g., phenyl allyl carbonate; vinyl esters such as vinyl acetate; styrene; vinyl chloride; and anhydrides having a single ethylenically unsaturated group, e.g., maleic anhydride, 1-cyclopentene-1,2-dicarboxylic anhydride and itaconic anhydride. Preferred monoethylenically unsaturated monomers include, maleic anhydride, 1-cyclopentene-1,2-dicarboxylic anhydride, itaconic anhydride, allyl benzoate, phenyl allyl carbonate, styrene, methyl methacrylate, isobornyl methacrylate, phenoxyethyl methacrylate, cyclohexyl methacrylate, vinyl acetate, vinyl chloride and mixtures thereof. If used in the polymerizable composition, monoethylenically unsaturated monomer(s) are typically present in an amount of not greater than 30 percent by weight, preferably not greater than 20 percent by weight, and more preferably not greater than 10 percent by weight, based on the total weight of the polymerizable composition.

The polythiol used to prepare the prepolymer of the present invention, e.g., the first polythiol monomer, has at least two thiol groups. Examples of polythiols from which the first polythiol monomer may be selected include, for example, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate), and mixtures thereof.

Polythiol monomers useful in the present invention may further include those represented by the following general formula VI,

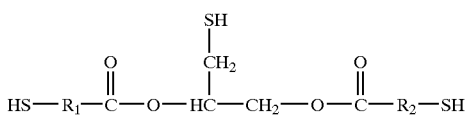

and the following general formula VII,

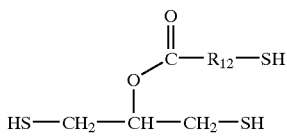

In general formulas VI and VII, $R_1$, $R_2$ and $R_{12}$ are each independently selected from the group consisting of straight or branched chain alkylene, cyclic alkylene, phenylene and $C_1$–$C_9$ alkyl substituted phenylene, and mixtures of such polythiol monomers. The first polythiol monomer may also be selected from mixtures of one or more of those polythiol monomers as recited previously herein and the polythiols represented by general formulas VI and/or VII.

With further reference to general formulas VI and VII, examples of straight or branched chain alkylene from which $R_1$, $R_2$ and $R_{12}$ may each be selected include, but are not limited to, methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Examples of cyclic alkylenes from which $R_1$, $R_2$ and $R_{12}$ may each be selected include, but are not limited to, cyclopentylene, cyclohexylene, cycloheptylene, cyclooctylene, and alkyl substituted derivatives thereof. The divalent linking groups $R_1$, $R_2$ and $R_{12}$ may also be selected from phenylene and $C_1$–$C_9$ alkyl substituted phenylene, e.g., methyl, ethyl, propyl, isopropyl and nonyl substituted phenylene. In a preferred embodiment of the present invention, $R_1$, $R_2$ and $R_{12}$ are each methylene or ethylene.

The polythiol monomers represented by general formulas VI and VII may be prepared from an esterification or transesterification reaction between 3-mercapto-1,2-propanediol (Chemical Abstract Service (CAS) Registry No. 96-27-5) or 1,3-dimercapto-2-propanol respectively, and a thiol functional carboxylic acid or carboxylic acid ester in the presence of a strong acid catalyst, e.g., methane sulfonic acid, with the concurrent removal of water or alcohol from the reaction mixture. A preferred polythiol monomer as represented by general formula VI, for which $R_1$ and $R_2$ are both methylene, may be prepared as described herein in Synthetic Example I.

As used herein, the polythiol monomers described and named with reference to general formulas VI and VII (e.g., thioglycerol bis(2-mercaptoacetate) and 1,3-dimercapto-2-propanol mercaptoacetate) is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

The polymerizable organic composition of the present invention may optionally further include a second polythiol monomer, which may be the same or different than the polythiol monomer used to prepare the prepolymer, e.g., the first polythiol monomer. The second polythiol monomer may be selected independently from those recited previously herein with respect to the first polythiol monomer. If used, the second polythiol monomer is typically present in an amount of at least 2 percent by weight, preferably at least 4 percent by weight, and more preferably at least 6 percent by weight, based on the total weight of the polymerizable composition of the present invention. The second polythiol monomer may also be present in an amount of less than 50 percent by weight, preferably less than 35 percent by weight, and more preferably less than 20 percent by weight, based on the total weight of the polymerizable composition of the present invention. The second polythiol monomer may be present in an amount ranging between any combination of these values, inclusive of the recited values.

In an embodiment of the present invention, the polymerizable organic composition further includes the combination of one or more second polythiol monomers and one or more monoethylenically unsaturated monomers, each as described previously herein. For example, the polymerizable composition of the present invention may further include pentaerythritol tetra(mercaptoacetate) and phenoxyethyl methacrylate.

Polymerization of the polymerizable organic composition of the present invention may be accomplished by adding to the composition an initiating amount of material capable of generating free radicals, such as organic peroxy compounds or azobis(organonitrile) compounds, i.e., an initiator. Methods for polymerizing compositions having therein monomers containing radically polymerizable groups are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3, 3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate. A particularly preferred thermal initiator is 1,1-di-(t-butyl peroxy)-3,3,5-trimethylcyclohexane, which is commercially available from Elf Atochem under the tradename LUPERSOL® 231.

Examples of suitable azobis(organonitrile) compounds, that may be used as thermal polymerization initiators include azobis(isobutyronitrile) and azobis(2,4-dimethylvaleronitrile).

The amount of thermal polymerization initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred peroxy compound, 1,1-di-(t-butyl peroxy)-3,3,5-trimethylcyclohexane, typically between 0.01 and 3.0 parts of that initiator per 100 parts of monomers (phm) present in the polymerizable organic composition may be used. More usually, between 0.05 and 1.0 phm is used to initiate the polymerization. Typically, the thermal cure cycle involves heating the polymerizable organic composition in the presence of the initiator from room temperature to 85° C. to 130° C. over a period of from 2 hours to 48 hours.

Photopolymerization of the polymerizable organic composition according to the present invention may be carried out in the presence of a photopolymerization initiator using ultraviolet light, visible light, or a combination thereof. Examples of suitable photopolymerization initiators include benzoin, benzoin methyl ether, benzoin isobutyl ether, benzophenone, acetophenone, 4,4,-dichlorobenzophenone, diethoxyacetophenone, 2-hydroxy-2-methyl-1-phenylpropan-1-one, 1-hydroxycyclohexyl phenyl ketone, 2-isopropylthixanthone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. A preferred photopolymerization initiator is diphenyl (2,4,6-trimethylbenzoyl) phosphine oxide. The photopolymerization initiator is typically used in an amount from 0.01 percent to 2 percent by weight, based on the total weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator and/or the consequent cure cycle should be adequate to produce a polymerizate according to the present invention which has a 15 second Barcol hardness of at least 1, preferably at least 4, e.g., from 4 to 35.

It should be understood that the polymerizable organic composition of the present invention may be polymerized in the absence of a polymerization initiator. In particular, photopolymerization of the polymerizable organic composition of the present invention may be achieved in the absence of any externally added photopolymerization or thermal initiators.

Various conventional additives may be incorporated with the polymerizable organic composition of the present invention. Such additives may include light stabilizers, heat stabilizers, antioxidants, ultraviolet light absorbers, mold release agents, static (non-photochromic) dyes, pigments, polymerization inhibitors to promote stability during storage (e.g., non-acidic nitroso compounds as described in U.S. Pat. No. 5,358,976), and flexibilizing additives that are not radically polymerizable (e.g., alkoxylated phenol benzoates, poly(alkylene glycol) dibenzoates, and poly(alkoxylated) bisphenols). Antiyellowing additives, e.g., 3-methyl-2-butenol, organo pyrocarbonates and triphenyl phosphite (CAS registry no. 101-02-0), may also be added to polymerizable organic compositions of the present invention to enhance resistance to yellowing. Such additives are typically present in the compositions of the present invention in amounts totaling less than 10% by weight, preferably less than 5% by weight, and more preferably less than 3% by weight, based on the total weight of the polymerizable composition.

It is also contemplated that a polymerization moderator, or mixtures of polymerization moderators, may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable organic composition of the present invention in an amount from 0.01 percent to 10 percent by weight, preferably from 0.1 percent to 8 percent by weight and more preferably from 0.3 percent to 5 percent by weight, based on the total weight of the polymerizable organic composition.

Polymerizates obtained from polymerization of polymerizable organic compositions of the present invention will be solid, and preferably transparent, e.g., suitable for optical or ophthalmic applications. The polymerizates of the present invention will also have a refractive index of at least 1.57, preferably at least 1.58 and more preferably at least 1.59, adequately high Abbe numbers, e.g., an Abbe number of at least 33 and preferably at least 35, and a 15 second Barcol hardness of at least 1. Solid articles that may be prepared from polymerizable organic compositions of the present invention include, but are not limited to, optical lenses, such as piano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos.: 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates, which are described in, for example, U.S. Pat. No. 3,361,706. Fulgides and fulgimides, e.g. the 3-furyl and 3-thienyl fulgides and fulgimides, are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include: (a) dissolving or dispersing the substance within the polymerizate, e.g., imbibition of the photochromic substance into the polymerizate by immersion of the polymerizate in a hot solution of the photochromic substance or by thermal transfer; (b) providing the photochromic substance as a separate layer between adjacent layers of the polymerizate, e.g., as a part of a polymer film or polymer layer; and (c) applying the photochromic substance as part of a coating or polymer layer placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the polymerizable organic compositions of the present invention prior to curing. However, when this is done it is preferred that the photochromic substance(s) be resistant to potentially adverse interactions with initiator(s) that may be present and/or the polythiol monomer and the sulfide linkages that form within the polymerizate. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the polymerizable organic compositions of the present invention prior to curing.

The present invention is more particularly described in the following examples, which are intended to be illustrative only, since numerous modifications and variations therein will be apparent to those skilled in the art. Unless otherwise specified, all parts and percentages are by weight.

SYNTHETIC EXAMPLE I

A polythiol monomer, for which $R_1$ and $R_2$ are each methylene with reference to general formula VI, i.e., thioglycerol bis(mercaptoacetate), was prepared from the ingredients listed in Table 1.

TABLE 1

| Ingredient | Amount (grams) |
|---|---|
| Charge 1 | |
| 3-mercapto-1,2-propanediol | 1220 |
| 2-mercaptoacetic acid | 2333 |
| methane sulfonic acid | 14.2 |
| Charge 2 | |
| aqueous ammonia* | 4218 |

*An aqueous solution of 5% by weight ammonia.

Charge 1 was added to a five liter round bottom flask equipped with a magnetic stirrer, a thermocouple and heating mantle coupled through a temperature feed-back control device, and a vacuum distillation column. A vacuum of from 5 to 10 millimeters (mm) of Hg was drawn and the reaction mixture was heated to and held at 70° C. for a period of 4 to 5 hours while water was collected from the distillation column.

When no more water was observed to be collected from the distillation column, the reaction mixture was cooled to room temperature and transferred to a twelve liter round bottom flask equipped with a motor driven stir-blade, a thermocouple and a water cooled jacket. Charge 2 was added to the mixture, which was then stirred for 30 to 45 minutes with an accompanying exotherm of from 10° C. to 20° C. Upon cooling to room temperature, the reaction mixture was left standing to allow for the accumulation of an upper layer of ammonia, which was removed by suctioning with a pipette. The remaining lower layer was washed three times each with two liters of deionized water. Vacuum stripping of water from the washed layer yielded 1995 grams of thioglycerol bis(mercaptoacetate) (i.e., TGBMA) in the form of a yellowish oil having a refractive index of 1.5825.

EXAMPLES A AND B

Prepolymers in the form of substantially gel-free liquids were prepared from the compositions listed in Table 2. The molar equivalent ratio of ethylenically unsaturated groups to thiol groups was 0.65:1 for each of Examples A and B.

TABLE 2

Prepolymer Examples

| Ingredients | A | B |
|---|---|---|
| DVB monomer (a) | 23.3 | 15.4 |
| TGBMA monomer (b) | 76.7 | 75.9 |
| MAAn monomer (c) | 0 | 8.7 |

(a) divinyl benzene monomer mixture containing 94.50 percent by weight divinyl benzene, 4.85 percent by weight of ethyl vinyl benzene, and having an equivalent weight of 67.07 grams/vinyl equivalent, as determined by gas chromatographic analysis.
(b) thioglycerol bis(mercaptoacetate) monomer, prepared in accordance with the method of Synthetic Example I and having an equivalent weight of 143.88 grams/thiol equivalent, as determined by iodimetric titration.
(c) methacrylic anhydride monomer.

The compositions of Table 2 were polymerized by stirring continuously at room temperature under air for a period of 24 hours. Physical properties of the compositions of Table 2 were measured before and after polymerization, the results of which are shown in Table 3.

TABLE 3

Physical Properties of Examples A and B

| | A | B |
|---|---|---|
| Initial Viscosity at 25° C. (cPs) (d) | 521 | 458 |
| Final Viscosity at 25° C. (cPs) (e) | 13,820 | 20,200 |
| % Consumption of ethylenically unsaturated groups (f) | 63% | 58% |

(d) Initial viscosities of the compositions were taken within minutes after mixing the monomers together, are given in units of centipoise (cPs), and were determined in accordance with American Standard Test Method (ASTM) D 2393-86, using a Brookfield Model LVTD Digital Viscometer.
(e) Final viscosities were taken after completion of prepolymerization, and were determined in accordance with ASTM D 2393-86, using a Brookfield Model LVTD Digital Viscometer.
(f) Percent (%) consumption of ethylenically unsaturated groups was determined from near infrared analysis using the following equation: 100x{(initial ethylenically unsaturated peak area of the composition) - (ethylenically unsaturated peak area of the polymerized composition)}/(initial ethylenically unsaturated peak area of the composition).

At the completion of the polymerization of the compositions of Table 2, the prepolymers, which were believed to contain a combination of prepolymer and unreacted monomers, were mixed with additional monomers to form polymerizable casting compositions according to the present invention, as described in Table 4. In Table 4, Examples 1, 2 and 4 are representative of embodiments of the present invention, and Examples 3 and 5 are comparative examples. Examples 1–3 represent thermally polymerizable casting compositions, and Examples 4 and 5 represent photopolymerizable casting compositions.

EXAMPLES 1–5

TABLE 4

Polymerizable Casting Compositions

| | Examples | | | | |
|---|---|---|---|---|---|
| Ingredients | 1 | 2 | 3 | 4 | 5 |
| Prepolymer-A | 50.8 | 0 | 0 | 55.4 | 0 |
| Prepolymer-B | 0 | 51.4 | 0 | 0 | 0 |
| DVB monomer | 20.7 | 24.6 | 32.5 | 19.6 | 32.5 |
| TGBMA monomer | 0 | 0 | 39.0 | 0 | 42.5 |
| PETMA monomer (g) | 8.5 | 8.5 | 8.5 | 0 | 0 |
| MAAn monomer | 20.0 | 15.5 | 20.0 | 25.0 | 25 |
| LUPERSOL ® 231 initiator (h) | 0.2 | 0.2 | 0.2 | 0 | 0 |
| LUCIRIN ® TPO initiator (i) | 0 | 0 | 0 | 0.3 | 0.3 |

Note:
"Prepolymer-A" refers to the prepolymer corresponding to Example A of Table 1, and likewise for "Prepolymer-B," as described previously herein.
(g) pentaerythritol tetra (mercaptoacetate) monomer.
(h) LUPERSOL ® 231 - an initiator having the reported chemical formula of 1,1-di(tert-butylperoxy)-3,3,5-trimethylcyclohexane, CAS Registry No. 6731-36-8, which is available commercially from Elf Atochem.
(i) LUCIRIN ® TPO - an initiator having the reported chemical formula of diphenyl (2,4,6-trimethylbenzoyl)phosphine oxide, which is available commercially from BASF Corporation Dispersions Group.

Examples 1, 2 and 3 of Table 4 had the following relative monomer compositions: DVB monomer/TGBMA monomer/PTMA monomer/MAAn monomer=32.5%/39.0%/8.5%/20.0% by weight, based on total monomer weight. Examples 4 and 5 of Table 4 had the following relative monomer compositions: DVB monomer/TGBMA monomer/MAAn monomer=32.5%/42.5%/25.0% by weight, based on total monomer weight. The relative monomer compositions were determined from an accounting of all of the monomers used to prepare the polymerizable compositions of Examples 1–5, inclusive of the monomers used to prepare the prepolymers in the case of Examples 1, 2 and 4.

Thermally polymerized cast sheets of the polymerizable casting compositions represented by Examples 1–3 of Table 4 were made in the following manner. The ingredients as listed were first charged to a suitable vessel followed by the addition of the LUPERSOL® 231 initiator. The resulting initiated polymerizable casting composition was mixed using a magnetic stir plate and magnetic stir bar at ambient room temperature. The mixed casting compositions were then poured into glass molds having interior dimensions of 15.24×15.24×0.32 cm. The filled molds were cured according to the following sequential thermal cure cycle: (1) heating from 40° C. to 125° C. at a constant rate over a period of 15 hours; (2) isothermal hold at 125° C. for 1 hour; and (3) cooled from 125° C. to 100° C. at a constant rate over a period of 2.5 hours; end of cycle. Physical properties of the casting compositions and the cast sheets were measured and the results are summarized in Table 5.

Photopolymerized cast sheets of the polymerizable casting compositions represented by Examples 4 and 5 of Table 4 were made in the following manner. The casting compositions were each added to a suitable vessel and mixed using a magnetic stir plate and magnetic stir bar at ambient temperature. The mixed casting compositions were then poured into ultraviolet (UV) light transmissive glass molds having interior dimensions of 15.24×15.24×0.32 cm.

The contents of the filled molds were photo-cured in the following manner. (1) A filled mold was passed several times beneath an ultraviolet (UV) light source until its contents were observed by visual inspection to have gelled. (2) Each 15.24×15.24 cm side of the glass mold was next passed an additional four times beneath the UV light source. (3) The mold was then placed in a 120° C. electric oven for one hour. The UV light source used was a FUSION SYSTEMS® D-Bulb, which was positioned at a distance of 15 cm (6 inches) above the glass molds. The glass molds were passed beneath the UV light source at a linear rate of 91 cm (3 ft)/minute using a model No. C636R conveyor belt system available commercially from LESCO Inc. A single pass beneath the UV light source as described was found to impart 4.9 Joules/cm$^2$ of UV energy to the interior of the glass molds used. Physical properties of the casting compositions and the cast sheets were measured and the results are summarized in Table 5.

TABLE 5

Physical Data Relating to Examples 1–5

| Physical Test | Example 1 | 2 | 3 | 4 | 5 |
|---|---|---|---|---|---|
| Heat Distortion Temperature (j) (° C. @ 10 mils) | 90 | 94 | 96 | 96.6 | 83.1 |
| Total Deflection (k) (mils) @ 130° C. | 89 | 89 | 94 | 71 | 83 |
| Refractive Index (l) ($n_D^{20}$) | 1.5978 | 1.5976 | 1.5977 | 1.5948 | 1.6005 |
| Abbe Number (m) | 36 | 36 | 36 | 36 | 35 |
| % Transmittance (n) | 90.6 | 90.8 | 90.8 | 91.2 | 92.4 |
| % Haze (o) | 0.4 | 0.5 | 0.4 | 1.1 | 28.4 |
| Density @ 25° C. of the Casting Compositions Prior to Casting (p). | 1.1479 | 1.1475 | 1.1265 | 1.16 | 1.10 |
| Density @ 23° C. of the Cast Sheets (q). | 1.292 | 1.292 | 1.292 | 1.274 | 1.280 |
| Percent Shrinkage (r) | 11.2 | 11.2 | 12.8 | 9.0 | 14.0 |
| Barcol Hardness (0 seconds) (s) | 47 | 47 | 48 | N.D.[(1)] | N.D. |
| Barcol Hardness (15 seconds) (s) | 45 | 45 | 45 | N.D. | N.D. |

(j) Heat Distortion Temperature is the temperature at which the test specimen was observed to have a deflection of 10 mils (254 microns), and was determined in accordance with ASTM D 648-95 using a Custom Scientific Instruments Model HDV3 DTUL/Vicat Softening Point Apparatus.
(k) Total Deflection at 130° C. is the total deflection (in units of mils) of the test specimen that was observed at this temperature, and was determined in accordance with ASTM D 648-95 using a Custom Scientific Instruments Model HDV3 DTUL/Vicat Softening Point Apparatus.
(l) Refractive Index $n_D^{20}$ was determined in accordance with ASTM D542-95, using a Bausch & Lomb Abbe-3L Refractometer.
(m) Abbe Number was determined using a Bausch & Lomb ABBE-3L Refractometer.
(n) Percent (%) Transmittance was determined in accordance with ASTM D 1003-95, using a HunterLab model ColorQuest II spectrophotometer.
(o) Percent Haze was determined in accordance with ASTM D 1003-95 using a HunterLab model ColorQuest II spectrophotometer.
(p) Prior to casting sheets, the densities of the polmerizable casting compositions of Examples 1–3 of Table 4 were determined in accordance with ASTM D 4052-96. In the case of Examples 4 and 5, prior to casting sheets, the densities of the polymerizable casting compositions were determined by weighing 20 ml volumes of the corresponding casting composition that had been drawn into a 60 ml plastic syringe.
(q) Density of the cast sheets was determined in accordance with ASTM D 792-91.
(r) Percent Shrinkage was determined using the following equation: 100x [(density of the cast sheet)-(density of the monomer composition)]/(density of the cast sheet).
(s) Barcol Hardness was determined in accordance with ASTM D 2583-95, taking scale readings immediately after the Barcol impresser point penetrated the specimen, i.e., at 0 seconds, and 15 seconds thereafter.
[(1)]Not Determined (N.D.)

The data of Table 5 shows that polymerizates obtained by either thermal-curing or UV-curing of polymerizable organic compositions of the present invention (i.e., Examples 1, 2 and 4) have reduced shrinkage and at least substantially equivalent physical properties relative to corresponding compositions prepared without a radically polymerizable prepolymer (i.e., Examples 3 and 5).

The present invention has been described with reference to specific details of particular embodiments thereof. It is not intended that such details be regarded as limitations upon the scope of the invention except insofar as and to the extent that they are included in the accompanying claims.

We claim:

1. A polymerizable organic composition comprising:

(a) a radically polymerizable prepolymer of,
      (i) at least one first polymerizable monomer having at least two radically polymerizable ethylenically unsaturated groups, and
      (ii) at least one first polythiol monomer having at least two thiol groups, the molar equivalent ratio of ethylenically unsaturated groups of (a)(i) to thiol groups of (a)(ii) is no greater than 1:1, and the percent consumption of ethylenically unsaturated groups of (a)(i) is selected such that said prepolymer is a substantially gel-free liquid at 25° C.; and (b) at least one second polymerizable monomer having at least two radically polymerizable ethylenically unsaturated groups, wherein a polymerizate of said polymerizable organic composition has a refractive index of at least 1.57, an Abbe number of at least 33, said polymerizable organic composition having a percent shrinkage less than that of a corresponding polymerizable composition containing substantially no prepolymer, said first and second radically polymerizable monomers each being substantially free of norbornene groups.

2. The polymerizable organic composition of claim 1 wherein the molar equivalent ratio of ethylenically unsaturated groups of (a)(i) to thiol groups of (a)(ii) is from 0.2:1 to 0.85:1, and the percent consumption of ethylenically unsaturated groups of (a)(i) is from 20 percent to 100 percent.

3. The polymerizable organic composition of claim 1 wherein said first and second ethylenically unsaturated monomers are each selected independently from at least one monomer having ethylenically unsaturated groups selected from the group consisting of vinyl, allyl, substituted allyl, (meth)acryloyl and combinations thereof.

4. The polymerizable organic composition of claim 3 wherein said first and second ethylenically unsaturated monomers having vinyl groups are each selected independently from the group consisting of divinyl benzene, diisopropenyl benzene, trivinyl benzene, divinyl naphthalene, halogen substituted derivatives of divinyl benzene, diisopropenyl benzene, trivinyl benzene and divinyl naphthalene, and mixtures thereof.

5. The polymerizable organic composition of claim 3 wherein said first and second ethylenically unsaturated monomers having methacryloyl groups are each selected independently from the group consisting of:

(i) (meth)acrylic anhydride;
   (ii) a monomer represented by the following general formula,

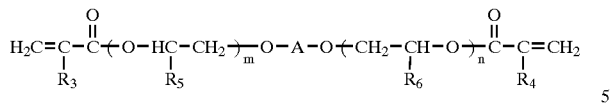

wherein m and n are each a positive number, the sum of m and n being from 0 to 70, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene, cyclic alkylene, phenylene, $C_1$–$C_9$ alkyl substituted phenylene, and a group represented by the following general formula,

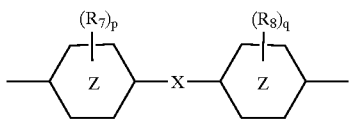

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$)(C$_6$H$_5$)— or

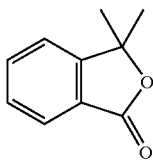

when

is the divalent benzene group, and X is O, S, —CH$_2$—, or —C(CH$_3$)$_2$— when

benzene group, and X is O, S, —CH$_2$-, or —C(CH$_3$)$_2$-when is the divalent cyclohexane group;

(iii) a bis[(meth)acryloyl-terminated]poly(ethylene glycol) monomer, that is different than monomer (ii), having a number average molecular weight from 200 to 2000 grams/mole;

(iv) a poly(meth)acryloyl terminated monomer represented by the following general formula,

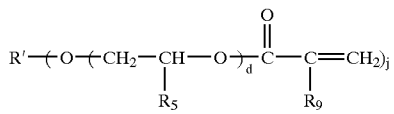

wherein R' is a polyvalent radical of a polyol, $R_9$ is hydrogen or methyl, $R_5$ is hydrogen or $C_1$ to $C_2$ alkyl, d is a number from 0 to 20, and j is a whole number from 3 to 6; and (v) mixtures of monomers selected from monomers (i), (ii), (iii) and (iv).

6. The polymerizable organic composition of claim 5 wherein X is —C(CH$_3$)$_2$—,

represents a divalent benzene group, p and q are each 0, $R_3$ and $R_4$ are each methyl, $R_5$ and $R_6$ are each hydrogen, the sum of m and n is from 2 to 30, R' is a radical of pentaerythritol, j is 3, $R_9$ is hydrogen and d is 0.

7. The polymerizable organic composition of claim 3 wherein said first and second ethylenically unsaturated monomers having allyl groups are each selected independently from monomers represented by the following general formula,

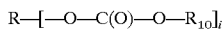

R—[—O—C(O)—O—R$_{10}$]$_i$ wherein R is a radical derived from a polyol, $R_{10}$ is a radical derived from an allyl or substituted allyl group and i is a whole number from 2 to 6.

8. The polymerizable organic composition of claim 7 wherein the polyol from which R is derived is 4,4'-isopropylidenediphenol, i is 2, and $R_{10}$ is a radical derived from an allyl group.

9. The polymerizable organic composition of claim 1 wherein said polymerizable organic composition further comprises a monoethylenically unsaturated monomer.

10. The polymerizable organic composition of claim 9 wherein said monoethylenically unsaturated monomer is selected from the group consisting of maleic anhydride, 1-cyclopentene-1,2-dicarboxylic anhydride, itaconic anhydride, allyl benzoate, phenyl allyl carbonate, styrene, methyl methacrylate, isobornyl methacrylate, phenoxyethyl methacrylate, cyclohexyl methacrylate, vinyl acetate, vinyl chloride and mixtures thereof.

11. The polymerizable organic composition of claim 1 further comprising at least one second polythiol monomer having at least two thiol groups.

12. The polymerizable composition of claim 11 wherein each of said first and second polythiol monomers are independently selected from the group consisting of 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly (ethylene glycol) di(3-mercaptopropionate), a polythiol monomer represented by the following general formula,

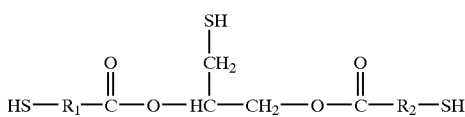

a polythiol monomer represented by the following general formula,

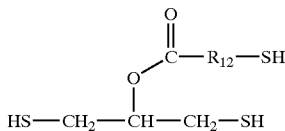

wherein $R_1$, $R_2$ and $R_{12}$ are each selected independently from the group consisting of straight or branched chain alkylene, cyclic alkylene, phenylene and $C_1$–$C_9$ alkyl substituted phenylene, and mixtures of such polythiol monomers.

13. A polymerizable organic composition comprising:
(a) a radically polymerizable prepolymer of,
   (i) a first polymerizable monomer selected from aromatic monomer having at least two vinyl groups, (meth)acrylic anhydride and mixtures thereof, and
   (ii) at least one first polythiol monomer having at least two thiol groups,
the molar equivalent ratio of ethylenically unsaturated groups of (a)(i) to thiol groups of (a)(ii) is no greater than 1:1, and the percent consumption of ethylenically unsaturated groups of (a)(i) is selected such that said prepolymer is a substantially gel-free liquid at 25° C.;
(b) a second polymerizable monomer selected from aromatic monomer having at least two vinyl groups, (meth)acrylic anhydride and mixtures thereof; and
(c) optionally monoethylenically unsaturated monomer, wherein a polymerizate of said polymerizable organic composition has a refractive index of at least 1.57, an Abbe number of at least 33, and said polymerizable organic composition has a percent shrinkage less than that of a corresponding polymerizable composition containing substantially no prepolymer.

14. The polymerizable organic composition of claim 13 wherein the molar equivalent ratio of ethylenically unsaturated groups of (a)(i) to thiol groups of (a)(ii) is from 0.2:1 to 0.85:1, and the percent consumption of ethylenically unsaturated groups of (a)(i) is from 20 percent to 100 percent.

15. The polymerizable organic composition of claim 14 wherein said aromatic monomers having at least two vinyl groups of (a)(i) and (b) are each independently selected from the group consisting of divinyl benzene, diisopropenyl benzene, trivinyl benzene, divinyl naphthalene, halogen substituted derivatives of divinyl benzene, diisopropenyl benzene, trivinyl benzene and divinyl naphthalene, and mixtures thereof, and said monoethylenically unsaturated monomer of (c) is selected from the group consisting of maleic anhydride, 1-cyclopentene-1,2-dicarboxylic anhydride, itaconic anhydride, allyl benzoate, phenyl allyl carbonate, styrene, methyl methacrylate, isobornyl methacrylate, phenoxyethyl methacrylate, cyclohexyl methacrylate, vinyl acetate, vinyl chloride and mixtures thereof.

16. The polymerizable organic composition of claim 15 further comprising at least one second polythiol monomer having at least two thiol groups, wherein each of said first and second polythiol monomers are independently selected from the group consisting of 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate), a polythiol monomer represented by the following general formula,

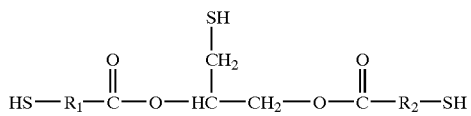

a polythiol monomer represented by the following general formula,

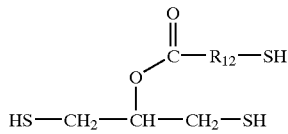

wherein $R_1$, $R_2$ and $R_{12}$ are each selected independently from the group consisting of straight or branched chain alkylene, cyclic alkylene, phenylene and $C_1$–$C_9$ alkyl substituted phenylene, and mixtures of such polythiol monomers.

17. The polymerizate of claim 1.
18. The polymerizate of claim 13.
19. A photochromic article comprising:
(a) the polymerizate of claim 1; and
(b) a photochromic amount of organic photochromic substance.

20. The photochromic article of claim 19 wherein the organic photochromic substance is selected from the group consisting of spiro(indoline)naphthoxazines, spiro(indoline)benzoxazines, benzopyrans, naphthopyrans, chromenes, organo-metal dithizonates, fulgides and fulgimides and mixtures of such organic photochromic substances.

* * * * *

UNITED STATES PATENT AND TRADEMARK OFFICE
CERTIFICATE OF CORRECTION

PATENT NO. : 6,669,873 B1
DATED : December 30, 2003
INVENTOR(S) : Robert A. Smith, Robert D. Herold and Michael O. Okoroafor It is certified that error appears in the above-identified patent and that said Letters Patent is hereby corrected as shown below:

Title page,
Item [73], Assignee, delete "PPC" and insert -- PPG --.

Column 21,
Lines 59-60, delete "benzene group, and X is O, S, --$CH_2$--, or --$C(CH_3)_2$--when."

Signed and Sealed this

Twenty-eighth Day of September, 2004

JON W. DUDAS
*Director of the United States Patent and Trademark Office*